(12) United States Patent
Ishimaru

(10) Patent No.: US 9,779,881 B2
(45) Date of Patent: Oct. 3, 2017

(54) ELECTROLYTIC CAPACITOR AND MANUFACTURING METHOD THEREOF

(71) Applicant: Panasonic Intellectual Property Management Co., Ltd., Osaka (JP)

(72) Inventor: Yoshiaki Ishimaru, Yamaguchi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 130 days.

(21) Appl. No.: 14/807,932

(22) Filed: Jul. 24, 2015

(65) Prior Publication Data
US 2015/0332857 A1 Nov. 19, 2015

Related U.S. Application Data

(63) Continuation of application No. PCT/JP2014/000473, filed on Jan. 30, 2014.

(30) Foreign Application Priority Data

Jan. 31, 2013 (JP) .................................. 2013-017173

(51) Int. Cl.
| | |
|---|---|
| *H01G 4/32* | (2006.01) |
| *H01G 9/04* | (2006.01) |
| *H01G 9/00* | (2006.01) |
| *H01G 9/15* | (2006.01) |
| *H01G 9/02* | (2006.01) |
| *H01G 9/07* | (2006.01) |
| *H01G 9/048* | (2006.01) |
| *H01G 9/025* | (2006.01) |

(Continued)

(52) U.S. Cl.
CPC .......... *H01G 9/151* (2013.01); *H01G 9/0036* (2013.01); *H01G 9/02* (2013.01); *H01G 9/025* (2013.01); *H01G 9/028* (2013.01); *H01G 9/048* (2013.01); *H01G 9/06* (2013.01); *H01G 9/07* (2013.01); *H01G 9/045* (2013.01); *Y10T 29/42* (2015.01)

(58) Field of Classification Search
CPC ............ H01G 4/32; H01G 4/38; H01G 4/224; H01G 9/151; H01G 9/02; H01G 9/048
USPC ............................. 361/301.5, 523, 530, 511
See application file for complete search history.

(56) References Cited

U.S. PATENT DOCUMENTS

| | | |
|---|---|---|
| 2002/0015278 A1 | 2/2002 | Fukuyama et al. |
| 2008/0002334 A1 | 1/2008 | Kakuma et al. |

FOREIGN PATENT DOCUMENTS

| | | |
|---|---|---|
| JP | 61-075124 U | 5/1986 |
| JP | H09-92580 A | 4/1997 |

(Continued)

OTHER PUBLICATIONS

International Search Report of PCT application No. PCT/JP2014/000473 dated Apr. 28, 2014.

*Primary Examiner* — Eric Thomas
*Assistant Examiner* — Arun Ramaswamy
(74) *Attorney, Agent, or Firm* — McDermott Will & Emery LLP

(57) ABSTRACT

An electrolytic capacitor includes wound body, a solid electrolyte layer, and resin layer. Wound body is formed by winding a positive electrode member having a surface with a dielectric film thereon and a negative electrode member. The solid electrolyte layer is formed by impregnating wound body with a dispersion of a conductive polymer or a solution of a conductive polymer, and then drying the dispersion or the solution with which wound body is impregnated. Resin layer covers at least a part of an outer peripheral surface of wound body.

19 Claims, 2 Drawing Sheets

(51) Int. Cl.
*H01G 9/028* (2006.01)
*H01G 9/06* (2006.01)
H01G 9/045 (2006.01)

(56) References Cited

FOREIGN PATENT DOCUMENTS

| | | |
|---|---|---|
| JP | 11-204377 | 7/1999 |
| JP | 2001-250747 | 9/2001 |
| JP | 2008-010657 | 1/2008 |
| JP | 2008-277348 | 11/2008 |

ELECTROLYTIC CAPACITOR AND MANUFACTURING METHOD THEREOF

BACKGROUND

1. Technical Field

The present technical field relates to a wound-type electrolytic capacitor and a method for manufacturing the same.

2. Background Art

Recently, as electronic apparatuses have higher performance, capacitors to be mounted on the electronic apparatuses is required to have larger capacitance and smaller equivalent series resistance (ESR). As such capacitors, a wound-type solid electrolytic capacitor is widely used. The solid electrolytic capacitor includes a capacitor element, a bottomed cylindrical exterior case housing the capacitor element, and a sealing member for sealing an opening part of the exterior case. The capacitor element includes a wound body. The wound body includes a positive electrode foil, a negative electrode foil, and a separator. On a surface of the positive electrode foil, a dielectric film is formed. In the wound body, the positive electrode foil and the negative electrode foil are wound in a state where the negative electrode foil is laminated on the positive electrode foil. The separator is laminated with the positive electrode foil and the negative electrode foil in such a manner in which the separator is interposed between the positive electrode foil and the negative electrode foil. The wound body is impregnated with a conductive polymer. The conductive polymer forms a solid electrolyte layer.

In a manufacturing process of the above-mentioned solid electrolytic capacitor, the wound body is impregnated with the conductive polymer by using polymerization methods such as an electrolytic polymerization method and a chemical polymerization method. Specifically, firstly, the wound body is immersed in a polymerization solution for forming the conductive polymer. Thus, the polymerization solution permeates a gap existing inside the wound body through the separator. Then, the conductive polymer is generated inside the wound body by polymerizing monomers in the polymerization solution. However, such a method makes a manufacturing process of a solid electrolytic capacitor complicated.

Then, as a method for impregnating a wound body with a conductive polymer, the following technique has been proposed. Firstly, a wound body is impregnated with a dispersion of a conductive polymer or a solution of a conductive polymer. Thus, the dispersion or the solution permeates a gap existing inside the wound body through a separator. Thereafter, the dispersion or the solution with which the wound body is impregnated is dried. As a result, the conductive polymer remains inside the wound body, and the conductive polymer forms a solid electrolyte layer.

SUMMARY

However, when a wound body is impregnated with a conductive polymer by using a dispersion or a solution, the density of the conductive polymer in the wound body becomes lower as compared with a case where the polymerization method is used. Therefore, a strength of the wound body is remarkably low with respect to stress applied to the wound body during manufacture or use of an electrolytic capacitor. A low strength of the wound body tends to bring an adverse effect on electrical characteristics or reliability of the electrolytic capacitor.

Furthermore, recently, along with reduction in thickness of an electronic apparatus, the height of an electrolytic capacitor mounted to the electronic apparatus is required to be reduced. In order to reduce the height of the electrolytic capacitor, it is necessary to reduce a width of each of a positive electrode foil and a negative electrode foil. However, this tends to cause winding displacement in the wound body. In particular, when an exterior case has conductivity, there is possibility that the positive electrode foil and the negative electrode foil are brought into contact with the exterior case to cause an electrical short-circuit.

An object of the present disclosure is to enhance a strength of a wound body and to prevent an electrical short-circuit which may be caused by winding displacement of the wound body in an electrolytic capacitor including a solid electrolyte layer formed by using a dispersion of a conductive polymer or a solution of a conductive polymer.

A first electrolytic capacitor in accordance with the present disclosure includes a wound body, a solid electrolyte layer, and a resin layer. The wound body is formed by winding a positive electrode member having a surface with a dielectric film thereon and a negative electrode member. The solid electrolyte layer is formed by impregnating the wound body with a dispersion of a conductive polymer or a solution of a conductive polymer, and then drying the dispersion or the solution with which the wound body is impregnated. The resin layer covers at least a part of an outer peripheral surface of the wound body. As an example, the resin layer covers at least a part of a winding end face of the wound body.

A second electrolytic capacitor in accordance with the present disclosure includes a wound body, a solid electrolyte layer, a resin layer, and a nonaqueous solvent. The wound body is formed by winding a positive electrode member having a surface with a dielectric film thereon and a negative electrode member. The solid electrolyte layer includes a conductive polymer with which the wound body is impregnated. The resin layer covers at least a part of the outer peripheral surface of the wound body. The nonaqueous solvent is in contact with the dielectric film and the solid electrolyte layer.

In a first manufacturing method among methods for manufacturing an electrolytic capacitor in accordance with the present disclosure, firstly, a wound body is formed by winding a positive electrode member having a surface with a dielectric film thereon and a negative electrode member. Next, the wound body is impregnated with a dispersion of a conductive polymer or a solution of a conductive polymer, and then the dispersion or the solution with which the wound body is impregnated is dried. Thus, a solid electrolyte layer is formed. After the solid electrolyte layer is formed, a resin layer covering at least a part of an outer peripheral surface of the wound body is formed.

In a second manufacturing method among the methods for manufacturing an electrolytic capacitor in accordance with the present disclosure, firstly, a wound body is formed by winding a positive electrode member having a surface with a dielectric film thereon and a negative electrode member. Next, a solid electrolyte layer is formed by impregnating the wound body with a conductive polymer. After the solid electrolyte layer is formed, a resin layer covering at least a part of an outer peripheral surface of the wound body is formed. After the resin layer is formed, the wound body is impregnated with a nonaqueous solvent.

According to an electrolytic capacitor and a method for manufacturing the electrolytic capacitor of the present disclosure, a strength of a wound body can be enhanced and an electrical short-circuit which may be caused by winding displacement in the wound body can be prevented.

DETAILED DESCRIPTION OF PREFERRED EMBODIMENTS

Hereinafter, an embodiment in which the present disclosure is applied to an electrolytic capacitor impregnated with a solid electrolyte and a nonaqueous solvent (commonly known as, a hybrid-type electrolytic capacitor) are specifically described.

Figure 1:
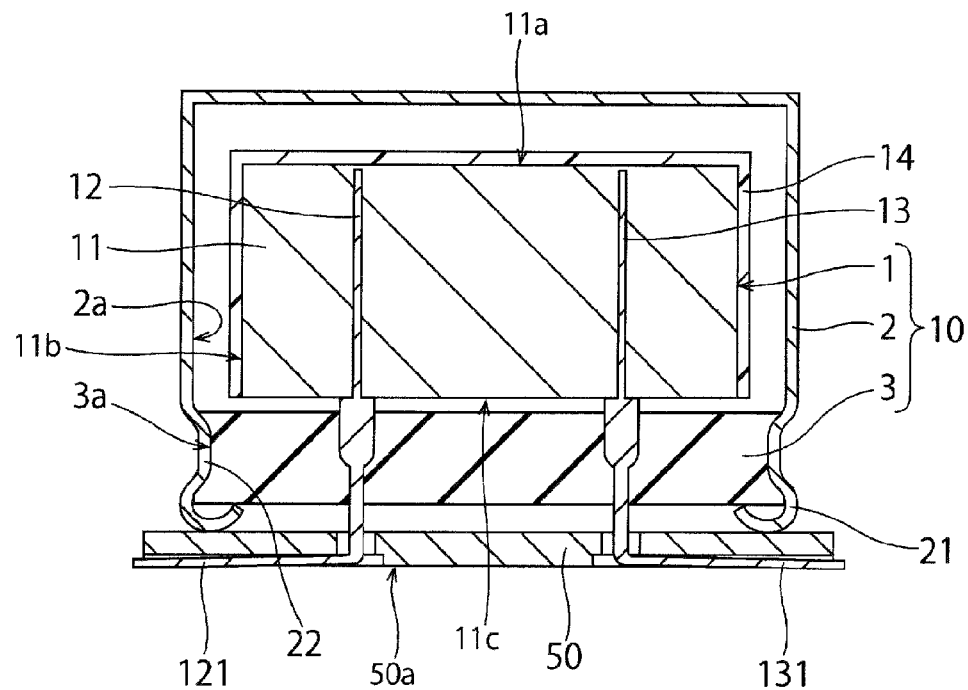
FIG. 1 is a sectional view showing an electrolytic capacitor in accordance with an exemplary embodiment of the present disclosure.

FIG. 1 is a sectional view showing an electrolytic capacitor in accordance with the exemplary embodiment of the present disclosure. As shown in FIG. 1, the electrolytic capacitor includes capacitor main body 10, and seat plate 50 on which capacitor main body 10 is mounted. Capacitor main body 10 includes capacitor element 1, bottomed cylindrical exterior case 2 housing capacitor element 1, and sealing member 3 fitted and inserted into opening part 21 of exterior case 2.

Capacitor element 1 includes wound body 11, resin layer 14, positive electrode lead tab terminal 12, and negative electrode lead tab terminal 13. Wound body 11 is formed by laminating and winding a positive electrode foil, a negative electrode foil, and a separator onto each other. The positive electrode foil and the negative electrode foil are respectively formed of valve metal such as aluminum, tantalum, and niobium. A dielectric film is formed on a surface of the positive electrode foil. Note here that wound body 11 may be formed by winding various forms of positive electrode members and negative electrode members not limited to foils.

The separator is laminated on the positive electrode foil and the negative electrode foil such that it is interposed between the positive electrode foil and the negative electrode foil in wound body 11. A place between the positive electrode foil and the negative electrode foil is impregnated with a conductive polymer, and the conductive polymer forms a solid electrolyte layer. The solid electrolyte layer is formed by impregnating wound body 11 with a dispersion in which the conductive polymer particles are dispersed, and then drying the dispersion with which wound body 11 is impregnated. Note here that the solid electrolyte layer may be formed by impregnating wound body 11 with a solution of a conductive polymer, and then drying the solution with which wound body 11 is impregnated.

It is preferable that the conductive polymer has high conductance. Examples of such a conductive polymer include polypyrrole, polythiophene, polyaniline, polyfuran, and derivatives thereof. Among them, polyethylene dioxythiophene (PEDOT) as a derivative of polythiophene is particularly preferable as a conductive polymer because it has a high self-repairing function in addition to high conductance. Note here that the solid electrolyte layer may include one type or a plurality of types of conductive polymers selected from various conductive polymers not limited to the above-mentioned conductive polymers.

Furthermore, wound body 11 is impregnated with a nonaqueous solvent having a high boiling point. The nonaqueous solvent fills a gap existing inside wound body 11, and is in contact with the dielectric film and the solid electrolyte layer. It is preferable that the nonaqueous solvent can exhibit a repairing effect for repairing a damaged part of the dielectric film by being soaked into wound body 11. Furthermore, it is preferable that the nonaqueous solvent does not deteriorate the conductive polymer with which the solvent is brought into contact. Examples of such a nonaqueous solvent include γ-butyrolactone (boiling point: 204° C.), sulfolane (boiling point: 285° C.), ethylene glycol (boiling point: 197.3° C.). Note here that the nonaqueous solvent is not limited to these solvents and may include one or a plurality of solvents selected from various solvents having a high boiling point and capable of exhibiting a repairing effect. Furthermore, the nonaqueous solvent may include an electrolyte or an additive.

Resin layer 14 covers winding end face 11a (an upper end surface in FIG. 1) and side peripheral surface 11b of wound body 11. In this way, in this exemplary embodiment, a part of the outer peripheral surface of wound body 11 is covered with resin layer 14. Resin layer 14 is formed by hardening, for example, thermosetting resin such as epoxy resin and phenol resin. Note here that resin layer 14 may be a hardened photo-setting resin. Examples of the photo-setting resin include acrylic resin hardened by irradiation with ultraviolet ray. Furthermore, resin layer 14 is not limited to one-component resin hardened by heating or light irradiation, and may be two-component resin hardened by mixing a liquid curing agent. Furthermore, resin layer 14 may be resin obtained by drying a solution in which resin is dissolved in a solvent.

Covering of wound body 11 with resin layer 14 enhances the strength of wound body 11 against stress applied to wound body 11 during manufacture or use of the electrolytic capacitor. In order to further enhance the strength of wound body 11, it is preferable that resin layer 14 not only covers the outer peripheral surface of wound body 11 but also exists inside wound body 11. Specifically, it is preferable that a part of hardened resin constituting resin layer 14 is interposed between the positive electrode foil and the negative electrode foil in at least a part of a region of inside wound body 11. As such a configuration, it is particularly preferable that the hardened resin exists in a vicinity of winding end face 11a and/or winding end face 11c (a lower end surface in FIG. 1) inside wound body 11.

Positive electrode lead tab terminal 12 is electrically connected to the positive electrode foil, and negative electrode lead tab terminal 13 is electrically connect to the negative electrode foil. Positive electrode lead tab terminal 12 and negative electrode lead tab terminal 13 are led out of winding end face 11c of wound body 11. Note here that the number of positive electrode lead tab terminals 12 to be connected to the positive electrode foil is not limited to one, and a plurality of positive electrode lead tab terminals 12 may be connected. Furthermore, the number of negative electrode lead tab terminals 13 to be connected to the negative electrode foil is not limited to one, and a plurality of negative electrode lead tab terminals 13 may be connected.

Positive electrode lead tab terminal 12 and negative electrode lead tab terminal 13 penetrate through sealing member 3. Thus, capacitor element 1 is fixed to sealing member 3, and lead part 121 of positive electrode lead tab terminal 12 and lead part 131 of negative electrode lead tab terminal 13 are led to the outside of exterior case 2. Lead parts 121 and 131 penetrate through seat plate 50 and bend such that tip end parts thereof bend along bottom surface 50a of seat plate 50. In this way, outer terminals of the electrolytic capacitor are formed of parts of lead parts 121 and 131 located on bottom surface 50a of seat plate 50.

Exterior case 2 is made of metal material such as aluminum. Opening part 21 of exterior case 2 is horizontally drawn, so that opening part 21 is provided with drawn part 22 for fixing sealing member 3 to exterior case 2. In this exemplary embodiment, an opening end of exterior case 2 is curled. Note here that exterior case 2 is not only formed of metal material but also may be formed of various material including electrically insulating material.

Sealing member 3 is formed of elastic material such as rubber. Drawn part 22 compresses sealing member 3 from the periphery to the inside, thereby sealing member 3 is elastically deformed and side peripheral surface 3a is brought into close contact with inner peripheral surface 2a of exterior case 2. In this way, opening part 21 of exterior case 2 is sealed by sealing member 3. Note here that opening part 21 of exterior case 2 may be sealed by filling opening part 21 with resin material instead of the fitting and insertion of sealing member 3.

According to the electrolytic capacitor of this exemplary embodiment, existence of resin layer 14 improves the strength of wound body 11. Furthermore, even when wound body 11 is housed in conductive exterior case 2, an electrical short-circuit, which may be caused (in particular, on winding end face 11a) when the positive electrode foil and the negative electrode foil are brought into contact with exterior case 2, can be prevented from occurring by resin layer 14.

Furthermore, in the electrolytic capacitor of this exemplary embodiment, a nonaqueous solvent is in contact with the dielectric film and the solid electrolyte layer. Accordingly, when a voltage is applied to the electrolytic capacitor, the repairing effect of the nonaqueous solvent is exhibited. Thus, a damaged part of the dielectric film is repaired. As a result, the reliability of the electrolytic capacitor is improved.

In addition, in the electrolytic capacitor of this exemplary embodiment, resin layer 14 is attached to at least a part of the surface of the solid electrolyte layer. Therefore, as compared with a conventional electrolytic capacitor which does not include resin layer 14, a component of the conductive polymer contained in the solid electrolyte layer is not easily eluted from the solid electrolyte layer to the nonaqueous solvent. Therefore, properties are not easily deteriorated in the electrolytic capacitor of this exemplary embodiment. In addition, when resin layer 14 is attached to at least a part of the surface of the solid electrolyte layer, swelling of the solid electrolyte layer, which may be caused by absorption of the nonaqueous solvent, is suppressed. As a result, the density of the conductive polymer is not easily reduced. Therefore, in the electrolytic capacitor of this exemplary embodiment, the conductance of the solid electrolyte layer is not easily reduced.

Figure 2:
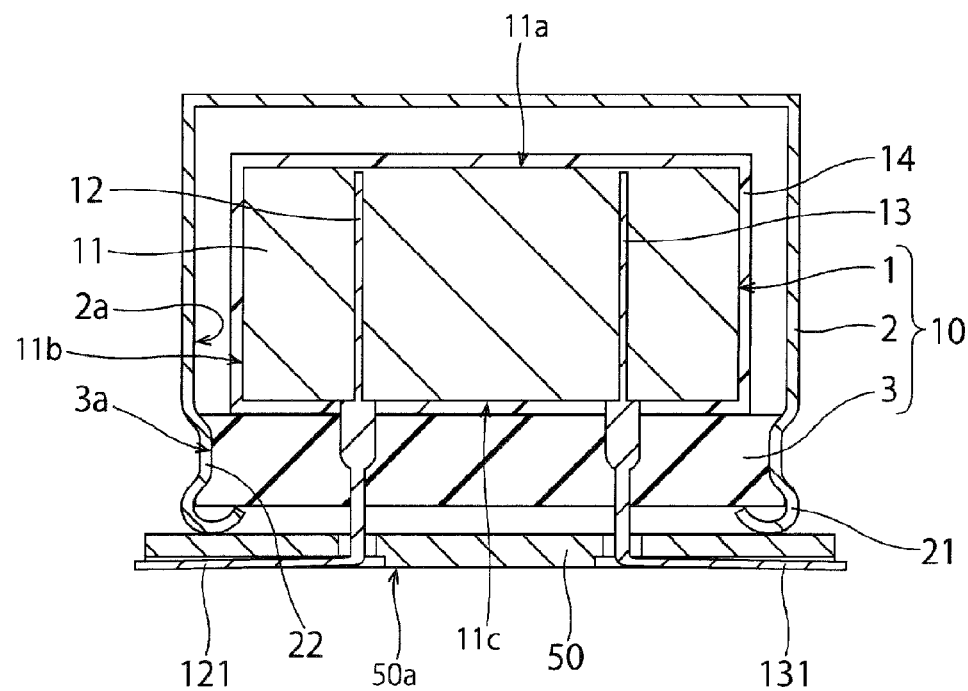
FIG. 2 is a sectional view showing a modified example of the electrolytic capacitor.

FIG. 2 is a sectional view showing a modified example of the above-mentioned electrolytic capacitor. As shown in FIG. 2, resin layer 14 may cover entire outer peripheral surface of wound body 11. In this modified example, resin layer 14 has a structure such as a porous structure including a gap through which a nonaqueous solvent passes such that a nonaqueous solvent permeates the inside of wound body 11 when wound body 11 is impregnated with the nonaqueous solvent in a manufacturing process of the electrolytic capacitor (the below-mentioned nonaqueous-solvent impregnation step). The electrolytic capacitor of this modified example enhances the strength of wound body 11. Furthermore, an electrical short-circuit, which may occur when the positive electrode foil and negative electrode foil are brought into contact with exterior case 2, is reliably prevented from occurring by resin layer 14.

Figure 3:
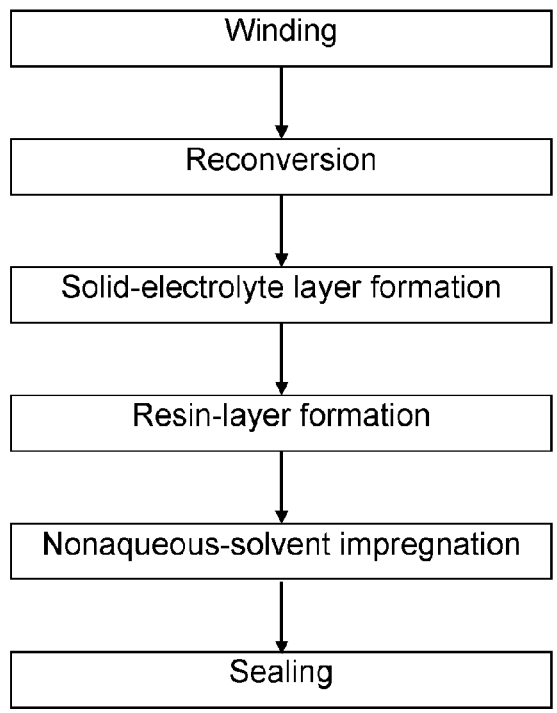
FIG. 3 is a flowchart showing a manufacturing method of the electrolytic capacitor in accordance with the exemplary embodiment.

Next, a method for manufacturing an electrolytic capacitor in accordance with this exemplary embodiment is specifically described. FIG. 3 is a flowchart showing the manufacturing method. In this exemplary embodiment, a winding step, a reconversion step, a solid-electrolyte layer formation step, a resin layer formation step, a nonaqueous-solvent impregnation step, and a sealing step are carried out sequentially in this order.

In the winding step, wound body 11 is formed by winding a positive electrode foil, a negative electrode foil, and a separator around a winding core. Then, in order to prevent wound body 11 from being deformed, a winding-fixing tape is wound onto the outermost peripheral surface of wound body 11. Positive electrode lead tab terminal 12 and negative electrode lead tab terminal 13 are attached to the positive electrode foil and the negative electrode foil, respectively, before winding or during winding. Note here that the positive electrode foil is formed by cutting a metal foil having a dielectric film on the surface thereof into a predetermined shape. Therefore, in the cut surface, a part of metal constituting the positive electrode foil is exposed. Furthermore, the dielectric film is easily damaged due to stress applied to the positive electrode foil during winding.

In the reconversion step, wound body 11 is subjected to reconversion treatment. Specifically, wound body 11 is immersed in a conversion solution such as an aqueous solution of ammonium adipate, and a voltage is applied between positive electrode lead tab terminal 12 and the conversion solution. Thus, the dielectric film is formed on an exposed surface (cut surface) of the positive electrode foil, and the damaged part of the dielectric film is repaired.

In the solid-electrolyte layer formation step, firstly, a dispersion of a conductive polymer or a solution of a conductive polymer is prepared. Examples of the conductive polymer include polypyrrole, polythiophene, polyfuran, or derivatives thereof. Among them, polyethylene dioxythiophene that is a derivative of polythiophene is particularly preferable because it has a high self-repairing function in addition to high conductance. Note here that the conductive polymer is not necessarily limited to the above, and may be one conductive polymer selected from various conductive polymer and combination of a plurality of conductive polymers.

Next, wound body 11 is immersed in the prepared dispersion or the solution. Thus, the dispersion or the solution permeates the inside of wound body 11 through the separator. In this way, wound body 11 is impregnated with the dispersion or the solution. Thereafter, the dispersion or the solution with which wound body 11 is impregnated is dried so as to form a solid electrolyte layer. In this step, impregnation and drying of the dispersion or the solution may be repeated a plurality of times. Thus, the density of the conductive polymer in wound body 11 can be enhanced. However, even when impregnation and drying are repeated a plurality of times, the density of the conductive polymer in wound body 11 is lower as compared with the case where a solid electrolyte layer is formed by the polymerization method. Therefore, in this stage, the strength of wound body 11 is low.

Figure 4:
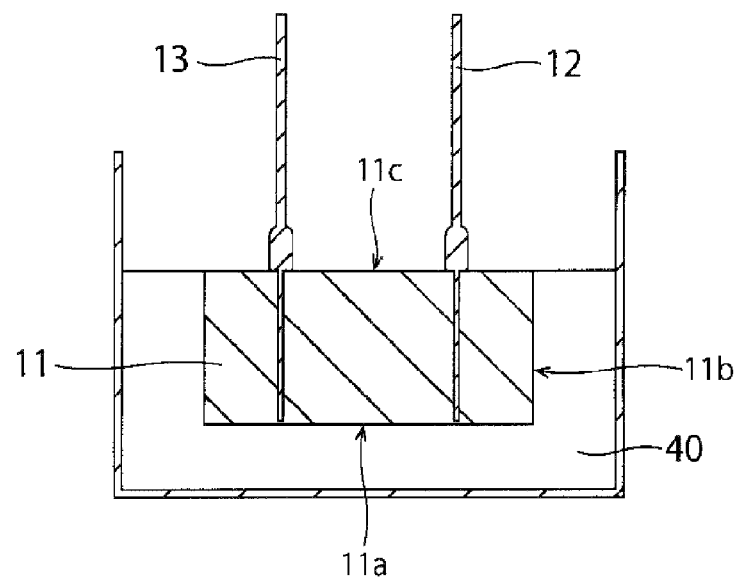
FIG. 4 is a view for illustrating a resin layer formation step carried out in the manufacturing method.

FIG. 4 is a view for illustrating a resin layer formation step. In the resin layer formation step, firstly, liquid resin 40 is prepared. As liquid resin 40, thermosetting resin such as epoxy resin and phenol resin can be used. Note here that as liquid resin 40, photo-setting resin may be used, or two-component resin or a solution in which resin is dissolved in a solvent may be used.

Next, as shown in FIG. 4, wound body 11 is immersed in prepared liquid resin 40. At this time, wound body 11 is immersed in prepared liquid resin 40 such that winding end face 11c and a liquid surface of liquid resin 40 are flush with each other in a state where positive electrode lead tab terminal 12 and negative electrode lead tab terminal 13 face upward. Thus, liquid resin 40 is attached to winding end face 11a and side peripheral surface 11b which are immersed in liquid resin 40 among the outer peripheral surfaces of wound body 11. Furthermore, liquid resin 40 infiltrates from winding end face 11a into the inside of wound body 11. Note here that liquid resin 40 may gradually infiltrate into the inside of wound body 11 from winding end face 11c in addition to infiltrating from winding end face 11a.

After wound body 11 is immersed in liquid resin 40, wound body 11 is lifted up from liquid resin 40 so as to harden liquid resin 40 attached to wound body 11. In this way, resin layer 14 is formed on winding end face 11a and side peripheral surface 11b of wound body 11. In the resin layer formation step, winding end face 11c of wound body 11 is hardly covered with resin layer 14. Furthermore, even if liquid resin 40 infiltrates from winding end face 11c into the inside of wound body 11, the amount thereof is small. Therefore, a gap existing inside of wound body 11 communicates to the outside via winding end face 11c. Therefore, resin layer 14 has a bottomed cylindrical shape that opens toward winding end face 11c, and functions as a container in the below-mentioned nonaqueous-solvent impregnation step. That is to say, when wound body 11 is immersed in a nonaqueous solvent, the nonaqueous solvent permeates the inside of wound body 11 from a winding end face 11c side, and the permeate nonaqueous solvent not leaks out of wound body 11 but remains inside wound body 11.

When an electrolytic capacitor of the modified example shown in FIG. 2 is produced, an entire part of wound body 11 is immersed in liquid resin 40 in the resin layer formation step. In this case, however, it is preferable to use liquid resin 40 whose hardened product has a structure such as a porous structure including a gap through which a nonaqueous solvent passes, so that the nonaqueous solvent can permeate the inside of wound body 11 in the below-mentioned nonaqueous-solvent impregnation step.

In the nonaqueous-solvent impregnation step, firstly, a nonaqueous solvent with which wound body 11 is impregnated is prepared. It is preferable that the nonaqueous solvent can exhibit a repairing effect for repairing a damaged part of the dielectric film by being soaked into wound body 11. Furthermore, it is preferable that the nonaqueous solvent is a solvent that does not deteriorate the conductive polymer with which the solvent is brought into contact. As such a nonaqueous solvent, γ-butyrolactone (boiling point: 204° C.), sulfolane (boiling point: 285° C.), ethylene glycol (boiling point: 197.3° C.), and the like, can be used. Note here that the nonaqueous solvent is not limited to these solvents and may be one solvent or a combination of a plurality of solvents selected from various solvents having a high boiling point and capable of exhibiting the repairing effect. Furthermore, the nonaqueous solvent may include an electrolyte or an additive.

Next, wound body 11 is immersed in the prepared nonaqueous solvent. Thus, the nonaqueous solvent permeates the inside of wound body 11 through the separator. In this way, the gap existing inside of wound body 11 is filled with the nonaqueous solvent, and the dielectric film and the solid electrolyte layer are brought into contact with the nonaqueous solvent.

In the sealing step, capacitor element 1 is inserted into exterior case 2 and opening part 21 of exterior case 2 is sealed with sealing member 3 in a state in which wound body 11 is housed in exterior case 2. In this way, capacitor main body 10 is completed. Thereafter, capacitor main body 10 is mounted to seat plate 50. Thus, an electrolytic capacitor shown in FIG. 1 is produced. Note here that in the sealing step, opening part 21 of exterior case 2 may be is filled with resin material, so that opening part 21 is sealed with the resin material.

Note here that a configuration of each component of the present disclosure is not limited to the above-mentioned exemplary embodiment, and may be modified within a technical scope described in claims. For example, resin layer 14 may cover at least a part of the outer peripheral surface of wound body 11 in a way not limited to the above-mentioned exemplary embodiments. Furthermore, the above-mentioned electrolytic capacitor may have a configuration in which wound body 11 is not impregnated with a nonaqueous solvent. In addition, in the above-mentioned electrolytic capacitor, the conductive polymer contained in the solid electrolyte layer may be formed by a polymerization method.

EXAMPLE

The inventor of the present application produces an electrolytic capacitor (rated voltage: 35 V, rated capacitance: 22 μF) by the following conditions as an example of the above-mentioned exemplary embodiment (Example). That is to say, an aluminum foil is used for a positive electrode foil and a negative electrode foil, and the positive electrode and negative electrode foils are wound together with a separator. At this time, winding displacement is allowed to generate intentionally. Polyethylene dioxythiophene is used as a conductive polymer. A place between the positive electrode foil and the negative electrode foil is impregnated with a dispersion in which polyethylene dioxythiophene particles are dispersed, and then, the dispersion is dried so as to form a solid electrolyte layer. As exterior case 2, an aluminum can having a diameter of 8 mm and a height of 12 mm is used. Furthermore, as resin for forming resin layer 14, epoxy resin that is thermosetting resin is used.

Furthermore, the inventor of the present application produces an electrolytic capacitor (rated voltage: 35 V, rated capacitance: 22 μF) which does not include resin layer 14 for comparison with Example (Comparative Example). Note here that other conditions are the same as those in Example.

The inventor of the present application examines yields of the electrolytic capacitors of Example and Comparative Example. As a result, the yield of Comparative Example is 94.6% while the yield in of Example is 99.8%.

Furthermore, the inventor of the present application prepares 300 each of the electrolytic capacitors of Example and Comparative Example. Then, the electrolytic capacitors are examined to measure the initial property thereof and a VPS (Vapor Phase Soldering) test is carried out with respect to the electrolytic capacitors. As the initial property, capacitance, equivalent series resistance (ESR), and leakage current are measured. As measurement conditions of the capacitance, the frequency at the time of measurement is set to 120 Hz. As measurement conditions of ESR, the frequency at the time of measurement is set to 100 kHz. A leakage current is measured after the rated voltage is applied to the electrolytic capacitors for two minutes. In the VPS test, a peak temperature at the time of the test is 240° C., and test time is 85 seconds. Then, the number of electrolytic capacitors in which a short circuit occurs at the time of the VPS test (the number of short-circuits) is examined. Measurement results of the initial property and the number of short-circuits are shown in Table 1.

TABLE 1

| | Capacitance (μF) | ESR (mΩ) | Leakage current (μA) | VPS test Number of short-circuits |
|---|---|---|---|---|
| Example | 21.9 | 16.3 | 0.5 | 0/300 |
| Comparative Example | 22.1 | 18.6 | 2.9 | 2/300 |

According to the results shown in Table 1, it is apparent that no significant difference in the capacitance is found between Example and Comparative Example. On the other hand, a value of ESR is smaller in Example (16.3 mΩ) than in Comparative Example (18.6 mΩ). Furthermore, a value of the leakage current is remarkably smaller in Example (0.5 μA) than in Comparative Example (2.9 μA). These results demonstrate that the existence of resin layer 14 contributes to reducing of the ESR and the leakage current.

Furthermore, as to the number of short-circuits, short-circuit occurs in two of 300 electrolytic capacitors in Comparative Example, while no short-circuit occurs in all 300 electrolytic capacitors in Example. This demonstrates that the existence of resin layer 14 reliably prevents an electrical short-circuit which may occur due to winding displacement of wound body 11.

What is claimed is:

1. An electrolytic capacitor comprising:
   a wound body including a positive electrode member having a surface with a dielectric film formed thereon and a negative electrode member wound together with the positive electrode member;
   a solid electrolyte layer formed by impregnating the wound body with a dispersion of a conductive polymer or a solution of a conductive polymer, and then drying the dispersion or the solution with which the wound body is impregnated; and
   a resin layer covering at least a part of an outer peripheral surface of the wound body,
   wherein a part of resin constituting the resin layer is interposed between the positive electrode member and the negative electrode member in at least a part of a region inside the wound body.

2. The electrolytic capacitor according to claim 1, further comprising a nonaqueous solvent in contact with the dielectric film and the solid electrolyte layer.

3. The electrolytic capacitor according to claim 1, wherein the resin layer covers at least a part of a winding end face of the wound body.

4. An electrolytic capacitor comprising:
   a wound body including a positive electrode member having a surface with a dielectric film formed thereon and a negative electrode member wound together with the positive electrode member;
   a solid electrolyte layer including a conductive polymer with which the wound body is impregnated;
   a resin layer covering at least a part of an outer peripheral surface of the wound body; and
   a nonaqueous solvent in contact with the dielectric film and the solid electrolyte layer,
   wherein a part of resin constituting the resin layer is interposed between the positive electrode member and the negative electrode member in at least a part of a region inside the wound body.

5. A method for manufacturing an electrolytic capacitor, the method comprising:
   forming a wound body by winding a positive electrode member having a surface with a dielectric film formed thereon and a negative electrode member;
   forming a solid electrolyte layer by impregnating the wound body with a dispersion of a conductive polymer or a solution of a conductive polymer, and then drying the dispersion or the solution with which the wound body is impregnated;
   forming a resin layer covering at least a part of an outer peripheral surface of the wound body after the solid electrolyte layer is formed; and
   impregnating the wound body with a nonaqueous solvent after the resin layer is formed.

6. A method for manufacturing an electrolytic capacitor, the method comprising:
   forming a wound body by winding a positive electrode member having a surface with a dielectric film formed thereon and a negative electrode member;
   forming a solid electrolyte layer by impregnating the wound body with a conductive polymer;
   forming a resin layer covering at least a part of an outer peripheral surface of the wound body after the solid electrolyte layer is formed; and
   impregnating the wound body with a nonaqueous solvent after the resin layer is formed.

7. The electrolytic capacitor according to claim 2, wherein the nonaqueous solvent has a boiling point higher than a boiling point of water.

8. The electrolytic capacitor according to claim 2, wherein at least one of an electrolyte and an additive is dissolved in the nonaqueous solvent.

9. The electrolytic capacitor according to claim 4, wherein the nonaqueous solvent has a boiling point higher than a boiling point of water.

10. The electrolytic capacitor according to claim 4, wherein at least one of an electrolyte and an additive is dissolved in the nonaqueous solvent.

11. The electrolytic capacitor according to claim 4, wherein the resin layer covers at least a part of a winding end face of the wound body.

12. The method for manufacturing an electrolytic capacitor according to claim 5, wherein the nonaqueous solvent has a boiling point higher than a boiling point of water.

13. The method for manufacturing an electrolytic capacitor according to claim 5, wherein at least one of an electrolyte and an additive is dissolved in the nonaqueous solvent.

14. The method for manufacturing an electrolytic capacitor according to claim 5, wherein a part of resin constituting the resin layer is interposed between the positive electrode member and the negative electrode member in at least a part of a region inside the wound body.

15. The method for manufacturing an electrolytic capacitor according to claim 5, wherein the resin layer covers at least a part of a winding end face of the wound body.

16. The method for manufacturing an electrolytic capacitor according to claim 6, wherein the nonaqueous solvent has a boiling point higher than a boiling point of water.

17. The method for manufacturing an electrolytic capacitor according to claim 6, wherein at least one of an electrolyte and an additive is dissolved in the nonaqueous solvent.

18. The method for manufacturing an electrolytic capacitor according to claim 6, wherein a part of resin constituting the resin layer is interposed between the positive electrode member and the negative electrode member in at least a part of a region inside the wound body.

19. The method for manufacturing an electrolytic capacitor according to claim 6, wherein the resin layer covers at least a part of a winding end face of the wound body.

* * * * *